United States Patent
Hayashi et al.

(10) Patent No.: US 8,945,683 B2
(45) Date of Patent: Feb. 3, 2015

(54) PREPREG FOR FIBER REINFORCED PLASTIC AND PRODUCTION PROCESS THEREOF

(75) Inventors: Noriya Hayashi, Aichi-ken (JP);
Shunichi Hayashi, Aichi-ken (JP);
Norio Miwa, Aichi-Ken (JP);
Toshikatsu Nohara, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 357 days.

(21) Appl. No.: 12/591,335

(22) Filed: Nov. 17, 2009

(65) Prior Publication Data
US 2010/0065205 A1    Mar. 18, 2010

Related U.S. Application Data

(62) Division of application No. 10/807,737, filed on Mar. 23, 2004, now abandoned.

(30) Foreign Application Priority Data

Mar. 31, 2003  (JP) .................................. 2003-095201

(51) Int. Cl.
| | |
|---|---|
| B05D 3/02 | (2006.01) |
| B05D 3/00 | (2006.01) |
| C04B 41/00 | (2006.01) |
| C08J 5/24 | (2006.01) |
| C08G 18/48 | (2006.01) |
| C08G 18/66 | (2006.01) |
| C08G 18/79 | (2006.01) |

(52) U.S. Cl.
CPC ............. *C08J 5/24* (2013.01); *C08G 18/4825* (2013.01); *C08G 18/6674* (2013.01); *C08G 18/797* (2013.01); *C08G 2280/00* (2013.01); *C08J 2375/04* (2013.01)
USPC .................. 427/532; 427/372.2; 427/385.5; 427/394; 427/294

(58) Field of Classification Search
CPC .... C08G 18/32; C08G 18/285; C08G 18/165; C08G 18/1816; C08G 18/1875; C08G 18/6674; C08G 18/4825; C08G 18/2875
USPC ........... 427/294, 296, 372.2, 385.5, 394, 487, 427/532
See application file for complete search history.

(56) References Cited

U.S. PATENT DOCUMENTS

| | | | | |
|---|---|---|---|---|
| 3,784,433 A | * | 1/1974 | Garnish et al. ................. | 156/276 |
| 3,886,229 A | * | 5/1975 | Hutchinson et al. ............ | 525/28 |
| 4,129,611 A | | 12/1978 | Heiss | |
| 4,535,009 A | * | 8/1985 | Tanaka et al. .................. | 427/246 |
| 4,767,643 A | * | 8/1988 | Westervelt et al. ........... | 427/512 |
| 4,857,579 A | | 8/1989 | Domeier | |
| 4,908,088 A | * | 3/1990 | Boyd et al. .................. | 156/307.3 |
| 5,071,613 A | | 12/1991 | Fukami et al. | |
| 5,223,598 A | * | 6/1993 | Yamada et al. ................. | 528/48 |
| 5,449,737 A | | 9/1995 | Uchida et al. | |
| 5,545,697 A | | 8/1996 | Uchida | |
| 5,574,472 A | | 11/1996 | Robinson | |
| 5,609,806 A | * | 3/1997 | Walsh et al. .................. | 264/136 |
| 6,136,883 A | | 10/2000 | Yang et al. | |
| 6,320,066 B1 | | 11/2001 | Audenaert et al. | |
| 6,399,199 B1 | * | 6/2002 | Fujino et al. .................. | 428/396 |
| 6,706,844 B2 | | 3/2004 | Dexheimer | |
| 2002/0045690 A1 | * | 4/2002 | Cheolas et al. ............... | 524/194 |

FOREIGN PATENT DOCUMENTS

| | | |
|---|---|---|
| DE | 34 13 938 A1 | 10/1985 |
| EP | 0 251 267 A1 | 6/1987 |
| EP | 0 240 118 A2 | 10/1987 |
| EP | 0 361 419 A2 | 4/1990 |
| EP | 0 367 014 A2 | 5/1990 |
| EP | 0 363 919 B1 | 1/1996 |
| GB | 919 500 | 2/1963 |
| JP | 02-043213 A | 2/1990 |
| JP | 02-092914 A | 4/1990 |
| JP | 02-150343 A | 6/1990 |
| JP | 02-214715 A | 8/1990 |
| JP | 02-215821 A | 8/1990 |
| JP | 02-238997 A | 9/1990 |
| JP | 03-237117 A | 10/1991 |
| JP | 05-320366 A | 12/1993 |

OTHER PUBLICATIONS

Notice of intention to grant a patent dated Nov. 7, 2014, in corresponding EP 09176383.9.

\* cited by examiner

*Primary Examiner* — Michael Wieczorek
(74) *Attorney, Agent, or Firm* — Foley & Lardner LLP

(57) ABSTRACT

A prepreg of FRP (fiber reinforced plastic) having with (i) a matrix resin composition containing a bifunctional isocyanate and/or a trifunctional isocyanate, a polyol and a bifunctional chain extender having two active hydrogen groups at a molar ratio, as a functional group, of isocyanate:polyol:chain extender=5.0 to 1.0:1.0:4.0 to 0, or containing a bifunctional isocyanate and/or a trifunctional isocyanate and a polyol at a molar ratio, as a functional group, of liquid isocyanate: polyol=0.9 to 1.1:1.0; and (ii) a fibrous material. A production process of the prepreg. According to the present invention, the prepreg has a sufficient pot life and permits convenient production of an FRP molding.

2 Claims, No Drawings

PREPREG FOR FIBER REINFORCED PLASTIC AND PRODUCTION PROCESS THEREOF

CROSS-REFERENCE TO RELATED PATENT APPLICATIONS

This application is a Divisional of U.S. application Ser. No. 10/807,737, filed Mar. 23, 2004, which claims priority from Japanese application JP 2003-095201, filed Mar. 31, 2003.

BACKGROUND OF THE INVENTION

1. Field of the Invention

The present invention relates to a prepreg for fiber reinforced plastic and a production process of the prepreg.

2. Prior Art

FRP is generally a fiber reinforced type plastic (fiber reinforced plastic) having a continuous fibrous material contained therein. It has a hardness comparable to that of ceramic, has a strength equal to that of metals, weighs about one fifth of iron, and has a modulus of elasticity about 3 to 4 times as much as that of iron. For such FRP, particularly CFRP (carbon fiber reinforced plastic, which may be included in "FRP"), an increase in the packing density of fibers and a resin per cross-sectional area of it has conventionally been an important research problem.

A proportion of fibers determines the strength of FRP. FRP containing an increased proportion of fibers has excellent strength, but a proper amount of a resin must be added in order to mold or form the FRP into a desired shape such as plate. The resin is also necessary for adhering fibers to each other. FRP has various kinds, depending on the weaving manner or twisting manner of fibers. For example, a cloth of about 10 m wide can be used as the fiber for FRP and such FRP is utilized for a plate or pipe of large-sized structures.

When producing such FRP, a fibrous material must be impregnated with a resin. The fibrous material can be impregnated better with a thermosetting resin than a thermoplastic resin. The thermosetting resin usually has a low viscosity so that use of it enables the production of fine and dense FRP and, in addition, its strength can be maintained high.

However, when FRP is produced in a conventional manner by using a thermosetting resin having shape memory properties, curing of the resin, for example, a two-part curing type resin, occurs as soon as mixing. In other words, the resin has a short pot life.

It was therefore impossible to process a fibrous material, which had been impregnated in advance with a thermosetting resin, after some storage time. In other words, a fibrous material impregnated with a thermosetting resin had to be molded or formed into a desired shape just after impregnation. In practice, application of FRP can be expanded if a fibrous material impregnated in advance with a thermosetting resin can be molded or formed into a desired shape at any molding or forming site.

In light of the above-described problem, the present inventors have carried out an extensive investigation on a prepreg for FRP having a sufficient pot life and permitting convenient production of an FRP molding, and a production process of the prepreg.

As a result, it has been found that the above-described problem will be overcome by a prepreg for FRP available by impregnating a fibrous material with a shape memory polymer having a specific composition, leading to the completion of the present invention.

SUMMARY OF THE INVENTION

In one aspect of the present invention, there is thus provided a prepreg for FRP which comprises a matrix resin composition (which may hereinafter be called "Composition 1") having a bifunctional isocyanate and/or a trifunctional isocyanate, a polyol, and a bifunctional chain extender containing an active hydrogen group at a molar ratio, as a functional group, of isocyanate:polyol:chain extender=5.0 to 1.0:1.0:4.0 to 0; and a fibrous material.

In another aspect of the present invention, there is also provided a prepreg for FRP, which comprises a matrix resin composition (which may hereinafter be called "Composition 2") having a bifunctional isocyanate and/or a trifunctional isocyanate and a polyol at a molar ratio, as a functional group, of liquid isocyanate:polyol=0.9 to 1.1:1.0; and a fibrous material.

The temperature at which a shape memory polymer exhibits its function is determined by its glass transition point (Tg), and an arbitrary composition having a Tg enough to satisfy the specifications of a product to which the polymer is applied may be used therefor. An increase in Tg shortens the pot life further so that it is a technical problem to attain both an increase in Tg (for example, about 95° C.) and adequate pot life.

Use of Composition 1 or Composition 2 having an arbitrary Tg in a semi-cured state makes it possible to attain a desired pot life.

In particular, Composition 2 is a polymer composition having a high Tg while having a pot life of from several tens of minutes to several hours. Such a polymer composition is available by omitting a conventionally essential chain extender in order to extend its pot life and heightening its Tg, which has been once lowered owing to the disuse of the chain extender, by using a low-molecular-weight polyol and adding the isocyanate and polyol at the above-described molar ratio. The composition is able to have a desired pot life by using the above-described polymer composition in the form of a prepreg.

The isocyanate to be used for the composition is preferably liquid at normal temperature.

The above-described polyol to be used for Composition 2 has an average molecular weight of from 100 to 550. The polyol preferably contains polypropylene glycol in an amount of 50 wt. % or greater, preferably 70 wt. % or greater, more preferably 90 wt. % or greater. Another polyol component is preferably an ether-based one free from risk of hydrolysis which is, at the same time, an aromatic or aliphatic side-chain-based one capable of having a high Tg from the viewpoint of its molecular design. The polyol is preferably bifunctional.

The term "prepreg for FRP" as used herein means a precursor of FRP which can be deformed at a temperature equal to or greater than the Tg of the semi-cured matrix resin but less than the pour point of the semi-cured matrix resin, restarts its curing when heated to the pour point or greater and becomes an FRP molding when the curing is completed. The term "pour point" as used herein means a temperature at which the form of the semi-cured matrix resin changes into a fluid from a solid. It is, for example, a temperature at which when a modulus of elasticity of the semi-cured matrix resin is determined by measuring a viscoelasticity, the modulus of elasticity cannot be detected because a semi-cured matrix sample is fluidized and becomes instable during heating. The term "semi-cured" means a state under which the composition is not cured enough and its crosslinking degree or polymerization degree is low. In general, a curable resin does not show fluidity by heating after curing. The composition of the present invention however features lower crosslinking density compared with ordinarily used curing resins. The crosslinking degree or polymerization degree is kept low by terminating curing when the composition is in the semi-cured state while making use of the above-described feature of the composition. Under such a semi-cured state, the crosslinking density and polymerization degree are both low so that the prepreg acquires a thermoplastic feature, in other words, it is solid at normal temperature but is molten and becomes liquid at least a predetermined temperature.

In a further aspect of the present invention, there is also provided a production process of a prepreg for FRP, which comprises impregnating a fibrous material with Composition 1. In the present invention, there is also provided a production process of a prepreg for FRP, which comprises impregnating a fibrous material with Composition 2.

In the production process of a prepreg for FRP according to the present invention, the polyol of Composition 2 has preferably an average molecular weight of from 100 to 550. In each of Composition 1 and Composition 2, the polyol contains polypropylene glycol preferably in an amount of 50 wt. % or greater, preferably 70 wt. % or greater, more preferably 90 wt. % or greater. Another polyol component is preferably an ether-based one free from risk of hydrolysis which is at the same time, an aromatic or aliphatic side-chain-based one capable of having an increased Tg from the viewpoint of its molecular design. The polyol is preferably bifunctional.

In a preferred mode according to the present invention, the production process of a prepreg for FRP comprises impregnating the fibrous material with the matrix resin, and then semi-curing the mixture. It is preferred to carry out semi-curing while keeping the matrix resin composition at a temperature lower by at least 10° C. from the curing temperature, preferably by at least 20° C. from the curing temperature, more preferably by at least 30° C. from the curing temperature. The term "curing temperature" as used herein means a peak temperature of curing extherm as measured, for example, by DSC (differential scanning calorimetry).

The production process of a prepreg for FRP according to the present invention is preferably performed under vacuum or reduced pressure.

A description will next be made of the inflatable function. In order to take materials into space and fabricate a structure there, the volume of each material during transport must be kept as small as possible. For example, a large apparatus such as a panel for a solar cell to be installed to an artificial satellite or space structure is required to be reduced in size when transporting from the Earth. An apparatus folded when transported is expanded into a predetermined shape suited for use in space such as satellite orbit. The property of a material which permits downsizing upon transport and expansion or development into a predetermined shape upon practical use is called "inflatability" (inflatable function).

Inflatability is also an important property for materials used for ground-based structures and use of an inflatable material enables compact storage (volume reduction) upon loading on a motor lorry or the like and expansion into a predetermined shape upon use at a fabrication or building site.

Structures having inflatability can be classified into those making use of mechanical action such as folding at joints, and those making use of action derived from a material property, that is, restoration into the original shape by heating.

Conventional inflatability tended to depend on mechanical structure and structures having inflatability were folded at a joint part. Upon use, therefore, some power was applied to the joint part to expand the structure into a predetermined shape. Such a structure, however, had the drawback that troubles such as disorders or accidents happened to occurred upon expansion.

Several studies have so far been made on structures having inflatability which depends on the action of a material property. A material having inflatability must be rigidified and have some strength when it is used for a large-sized structure.

Preferred examples of a polymer material which has been rigidified and has strength include FRP and CFRP produced using the prepreg for FRP according to the present invention. FRP is presumed to be imparted with inflatability by incorporating a fibrous material inside of a shape memory polymer.

The term "shape memory polymer" as used herein means, among conventional polymers, a resin whose molded shape and deformed shape can be used properly by temperature control with heat. A molded product obtained using this shape memory polymer is deformed at a glass transition point (Tg) or greater but less than a melting point of the polymer and by cooling it to the glass transition point (Tg) or less while keeping the deformed shape, the deformed shape is fixed, or by heating it to the glass transition point or greater but less than the melting point or decomposition point of the polymer, the original molded shape is recovered. Thus, the deformed shape and the molded shape can be used properly by temperature control.

FRP available by using the prepreg for FRP according to the present invention can have desirable inflatability (inflatable function).

DETAILED DESCRIPTION OF THE PREFERRED EMBODIMENTS

As described above, the present invention, in one aspect, relates to a prepreg for FRP and this prepreg for FRP is characterized by having Composition 1 or Composition 2 and a fibrous material.

Composition 1.

Composition 1 will next be described. In Composition 1, the resin composition is obtained by mixing at a molar ratio, as a functional group, of isocyanate:polyol:chain extender=5.0 to 1.0:1.0:4.0 to 0, preferably 3.0 to 1.2:1.0:2.0 to 0.2, more preferably 2.0 to 1.3:1.0:1.0 to 0.3.

Composition 1 is required to have, as its properties, initial impregnation property in order to impregnate a fibrous material with it sufficiently and at the same time, a pot life of a predetermined length.

Composition 1 preferably has a viscosity, as determined by the measurement of viscoelasticity, of 1000 cps or less in consideration of the impregnation property of reinforced fibers with it.

Its pot life is preferably 30 minutes or greater, more preferably 60 minutes or greater in order to prepare a dense FRP molding while maintaining a sufficient impregnation time of the fibrous material with Composition 1. The pot life here means a rise time necessary for Composition 1 to have a viscosity of, for example, about 1000 cps.

Moreover, in order to allow Composition 1 to exhibit an inflatable function, its Tg is usually from 50 to 70° C., preferably from about 55 to 60° C. from the viewpoint of retention of shape memory properties.

Examples of raw materials usable for Composition 1 will next be described, but raw materials are not limited thereto.

Examples of the bifunctional isocyanate and/or trifunctional isocyanate include those represented by the formula: OCN—R—NCO. Any isocyanate of the formula in which R represents a group having 0, 1 or 2 benzene rings can be used.

Specific examples include 2,4-tolylene diisocyanate, 4,4'-diphenylmethane diisocyanate, carbodiimide-modified 4,4'-diphenylmethane diisocyanate and hexamethylene diisocyanate. The isocyanate is preferably a liquid.

Examples of the bifunctional polyol include those represented by the formula: HO—R'—OH, in which R' represents a group having 0, 1 or 2 benzene rings, and products obtained by reacting the above-described bifunctional polyol with a bifunctional carboxylic acid or cyclic ether. Specific examples include polypropylene glycol, 1,4-butaneglycol adipate, polytetramethylene glycol, polyethylene glycol and bisphenol-A+propylene oxide.

In Composition 1, the above-described polyols which are ether-based ones free from risk of hydrolysis and at the same time, aromatic or aliphatic side-chain-based ones capable of having an increased Tg from the viewpoint of their molecular design are preferred. Of the above-described compounds, polypropylene glycol is preferred. It is contained as a monomer in the polyol components usually in an amount of 50 wt. % or greater, preferably 70 wt. % or greater, more preferably 90 wt. % or greater.

No particular limitation is imposed on the molecular weight of the polyol, but use of a polyol having a molecular weigh of 1000 or less, more preferably 650 or less is preferred. Polyols having an excessively high molecular weight are not preferred, because their Tg becomes low.

Examples of the bifunctional chain extender containing an active hydrogen group include those represented by the formula: HO—R"—OH. As R", any one of (CH2)n groups and groups having 1 or 2 benzene rings can be used. Specific examples include ethylene glycol, 1,4-butaneglycol, bis(2-hydroxyethyl)hydroquinone, bisphenol-A+ethylene oxide, and bisphenol-A+propylene oxide. Such a chain extender functions as a Tg regulator in Composition 1 and is used particularly for maintaining a high Tg.

As an additive to be used within a range not disturbing curing of Composition 1, at least one of ordinarily employed additives such as fillers, organic components and diluents can be added.

Composition 2.

Composition 2 will next be described. Composition 2 contains a bifunctional isocyanate and/or a trifunctional isocyanate and a polyol having an average molecular weight of from 100 to 550 at a molar ratio, as a functional group, of isocyanate:polyol=0.9 to 1.1:1.0.

Composition 2 is required to have, as its properties, an initial impregnation property in order to impregnate a fibrous material with it sufficiently and at the same time, to have a pot life of a predetermined length. Composition 2 has preferably a viscosity, as determined by the measurement of a viscoelasticity, of 1000 cps or less in consideration of the impregnation of reinforced fibers with Composition 2. Its pot life is preferably 30 minutes or greater, more preferably 60 minutes or greater in order to prepare a dense FRP molding product while maintaining a sufficient impregnation time of the fibrous material with Composition 2. Pot life here means a rise time necessary for Composition 2 to attain a viscosity of, for example, about 1000 cps. Moreover, in order to allow the molded FRP to exhibit an inflatable function, the Tg of Composition 2 is usually from 40 to 150° C., preferably from about 70 to 120° C. from the viewpoint of keeping its shape memory properties.

Composition 2 can satisfy the above-described conditions fully. Described specifically, it can attain both a high Tg (for example, about 95° C.) and enough pot life (for example, about 50 minutes).

Raw materials usable for Composition 2 will next be given, but examples are not limited thereto.

Examples of the bifunctional isocyanate and/or trifunctional isocyanate include those represented by the formula: OCN—R—NCO. Any isocyanate of this formula in which R represents a group having 0, 1 or 2 benzene rings can be used. Specific examples include 2,4-tolylene diisocyanate, 4,4'-diphenylmethane diisocyanate, carbodiimide-modified 4,4'-diphenylmethane diisocyanate and hexamethylene diisocyanate. The isocyanate is preferably a liquid.

In Composition 2, as the polyol, those having an average molecular weight of from 100 to 550 are used. When the molecular weight of the polyol exceeds 550, the resulting shape memory polymer has an increased pot life, but because of lowering in the Tg of Composition 2, it becomes difficult to maintain the Tg of the polymer composition at 40° C. or greater, which temperature is necessary for causing the shape memory properties such as shape fixity and shape recovery to appear in the space environment. When the average molecular weight is less than 100, on the other hand, the pot life necessary for the molding or forming of FRP becomes inadequate. The average molecular weight of the polyol of Composition 2 is preferably from 150 to 250. The term "average molecular weight" as used herein means a weight-average molecular weight as measured by gel permeation chromatography (GPC).

As the polyol, a bifunctional one is preferred in order to attain a great change in physical properties (for example, modulus of elasticity) at around Tg. Examples of the bifunctional polyol include those represented by the formula: HO—R'—OH, in which R' represents a group having 0, 1 or 2 benzene rings; and products obtained by reacting the above-described bifunctional polyol with a bifunctional carboxylic acid or cyclic ether. Specific examples include polypropylene glycol, 1,4-butaneglycol adipate, polytetramethylene glycol, polyethylene glycol and bisphenol-A+propylene oxide.

In Composition 2, among the above-described polyols, ether-based ones free from risk of hydrolysis which are, at the same time, aromatic or aliphatic side-chain-based ones capable of having an increased Tg from the viewpoint of its molecular design are preferred. Of the above-described compounds, polypropylene glycol is particularly preferred. It is contained usually in an amount of 50 wt. % or greater, preferably 70 wt. % or greater, more preferably 90 wt. % or greater, as a monomer in the polyol components.

The isocyanate and polyol are mixed at a molar ratio, as a functional group, of isocyanate:polyol=0.9 to 1.1:1.0 (which means NCO/OH=0.9 to 1.1). The composition available by mixing at such a ratio has a high Tg and is capable of exhibiting shape memory properties such as shape fixity and shape recovery while maintaining a necessary pot life. The above-described mixing ratio can also be expressed as a molar ratio, as a functional group, of isocyanate:polyol=0.95 to 1.05:0.95 to 1.05. A preferred mixing ratio is, as a molar ratio of a functional group, isocyanate:polyol=0.98 to 1.05:1.0 (NCO/OH=0.98 to 1.05).

Composition 2 does not contain a chain extender which is conventionally an essential component. The chain extender serves as a Tg regulator in the polymer composition and is used for maintaining a high Tg, but it tends to shorten the pot life. Composition 2 is able to have a high Tg without containing such a chain extender.

As an additive to be used within a range not disturbing curing of Composition 2, at least one of ordinarily employed additives such as fillers, organic components and diluents can be added.

Prepreg for FRP and Production Process of the Prepreg

The prepreg for FRP according to the present invention will next be described in further detail. It comprises Composition 1 or 2 and a fibrous material.

The fibrous material is not limited to fibers made of an organic material, but inorganic fibers such as glass fibers, and carbon fibers can be used. More specifically, carbon fibers and aramide fibers are suited. The weave is not limited and, for example, a plain weave fabric made of warp and weft threads can be used. The fibrous material having a thickness, for example, ranging from 0.1 to 1.0 mm can be used.

The prepreg for FRP according to the present invention may contain, in addition to Composition 1 or 2 serving as a matrix resin and the fibrous material, reinforcing fibers and colorants. Their proportion is not particularly limited.

Although there is no particular limitation imposed on the percentage composition of Composition 1 or 2 and the fibrous material contained in the prepreg for FRP according to the present invention, the volume content of the fibrous material usually ranges from 5 to 75 vol. %, preferably from 10 to 60 vol. %, more preferably from 20 to 55 vol. %. The theoretical volume of the fibrous material in the FRP can be calculated by dividing the weight of the fibrous material per unit area, in which the number of the stacked layers has been taken into consideration, by the density of the fibrous material. A volume content of the fibrous material less than 5 vol. % is not preferred, because the fibrous material cannot sufficiently play a role of reinforcing plastic. A volume content of the fibrous material exceeding 75 vol. %, on the other hand, impairs moldability or formability and prevents sufficient impregnation of the fibrous material with the resin, making it difficult to obtain a non-defective product. In addition, when the volume content of the fibrous material exceeds 60 vol. %, inflatability is not brought by Composition 1 or 2 fully. Within the volume content of the above range, an increase in the composition ratio of the fibrous material heightens the strength of the resulting molded product, while an increase in the resin content improves shape fixity.

The production process of a prepreg for FRP according to the present invention will next be described, but the process is not limited thereto.

As a desirable production process of a prepreg for FRP, vacuum RTM can be adopted. In this process, after disposal of a fibrous material in a mold, it is clamped. The mold is then evacuated by vacuum suction. Components of Composition 1 or 2 are mixed in advance in a container and the resulting mixture is poured in the mold to impregnate the fibrous material with Composition 1 or 2. Impregnation time is determined freely, depending on the composition of the polymer or kinds of the fibrous material. Composition 1 or 2 has a pot life of 30 minutes or greater so that impregnation is conducted for a period of time which is within this pot life and permits sufficient penetration of the resin into the fibers. After the impregnation, the composition is semi-cured while maintaining a vacuum condition. After semi-curing, the prepreg for FRP is released from the mold. The polymer composition is semi-cured under an arbitrary condition while taking in consideration the curing temperature of the composition (for example, for 1 hour at 80° C.+2 hours at 120° C.).

The term "semi-curing" as used herein means curing terminated at an incomplete stage of crosslinking. The matrix resin of the prepreg for FRP according to the present invention is not completely crosslinked so that when the temperature is raised again, it is melted and starts curing again, by which the prepreg is completely cured.

Semi-curing is effected by keeping the matrix resin during curing at a temperature lower by at least 10° C., preferably by at least 20° C., more preferably by at least 30° C., than its curing temperature. In other words, when curing termination of the curing in progress at a semi-cured state by adopting insufficient temperature conditions or curing time is important. For this, the temperature of the composition must be controlled so as to prevent its rise due to the curing exotherm. The other key point resides in the composition of the present invention as described above. The term "curing temperature" means a peak temperature of curing exotherm as measured, for example, by DSC (differential scanning calorimetry).

Compositions 1 and 2 are thermosetting resins. Compared with ordinary thermosetting resins, their crosslinking density is lower so that even though they are thermosetting resins, they have fluidity under a semi-cured state. The prepreg making use of this feature can take a solid form at normal temperature, can be handled easily and can be stored.

After layers of the prepreg for FRP are stacked one after another, the resin between the layers is fluidized by heating, making it possible to mold or form the FRP as one body. In other words, it is possible to mold or form the fibrous material impregnated in advance with the thermosetting resin into a desired shape at any place.

Since the prepreg for FRP according to the present invention has shape fixity—shape recovery properties and the Tg of the semi-cured matrix resin in the prepreg stage is lower than its pour point, it is possible to heat the prepreg layers at a temperature equal to or greater than the Tg of the semi-cured matrix resin but less than the pour point of it to make it transformable into any shape, stack them to fit in the mold and then, heat them at a temperature equal to or greater the pour point of the semi-cured matrix resin to complete the curing, which makes it possible to make the curing work easier. A semi-cured prepreg for FRP is available also by the below-described production process.

For example, hot press molding can be adopted. In this method, materials of Composition 1 or 2 may be poured in a resin tank and then, mixed; or prior to pouring in a resin tank, the materials are mixed in advance in another container. In the resin tank, the fibrous material is charged to impregnate it with the above-described mixture. In the semi-curing step of the prepreg for FRP after the impregnation, it is preferred to gradually raise the temperature to a temperature lower by 10° C., preferably by at least 20° C., more preferably by at least 30° C., than the curing temperature while disposing the fibrous material impregnated with the resin as a flat plate and applying considerable pressure thereto. It is also preferred to carry out semi-curing under vacuum in order to produce a dense and void-free prepreg, and prevent quality deterioration due to moisture. For the purpose of preventing quality deterioration due to moisture, semi-curing in an inert gas is also preferred.

The impregnation can also be conducted by taking the fibrous material off as a cloth, mat, tape or the like and then directing it through a resin tank filled with the polymer composition. As an alternative to the impregnation in the resin tank, a method of spraying Composition 1 or 2 downward or upward to the fibrous material can also be adopted as needed.

The prepreg for FRP can be produced not only as a prepreg composed of a single fibrous material, but also as a prepreg composed of at least two layers of one or more fibrous materials (fibrous materials of the same kind, fibrous materials different in kind, and any combination of a fabric, a unidirectional material and a nonwoven fabric). A laminate having a multilayer structure is formed by stacking at least two layers of the impregnated fibrous material prior to pressing and making them stick to each other closely. After stacking and adjusting its thickness, the resulting fibrous material such as plural layers of a cloth is caused to pass through a pressurizing mechanism and then, semi-cured.

Upon semi-curing, hot pressing is performed by increasing the temperature to 60-180° C. The pressure is usually about 0 to 20 kgf/cm2.

The resulting product is cut into pieces and then examined. Modes for carrying out the present invention were so far described. It should however be borne in mind that the present invention is not limited thereto but can be modified within an extent not departing from the scope of the present invention. The present invention will hereinafter be described in further detail by examples, but the present invention is not limited by them.

EXAMPLES

Example 1

A resin composition was prepared using, as an isocyanate component, a mixture (MDI, a base resin) of liquid carbodiimide-modified 4,4'-diphenylmethane diisocyanate and 4,4'-diphenylmethane diisocyanate; as a polyol component, bifunctional polypropylene glycol (PPG400, a curing agent) which was an aliphatic side-chain compound; and, as a chain extender, 1,4-butane glycol (1,4BG) at the below described composition ratio.

MDI/PPG400/1,4BG
=1.575/1.00/0.50 (function group ratio)
=117.7/100/11.25 (weight ratio)

The base resin and curing agent of the resin composition were cooled to room temperature after evacuation at 60° C. for about 2 hours. Stirring and mixing were then performed at a weight ratio of the isocyanate component (MDI)/polyol component (PPG400)/chain extender (1,4BG)=97/103/10, by which the white turbid resin component became transparent in about 2 minutes.

The transparent resin component was cast into a mold of 50 mm×10 mm×2 mm, in which it was semi-cured at 60° C. for 2 hours (solid at normal temperature).

The viscoelasticity of the semi-cured product thus obtained was measured, but undetectable because of a drastic lowering in the modulus of elasticity at 120° C. or greater (the resin sample to be measured became fluid by heating). It was confirmed that the sample after measurement became fluid and did not have an original shape.

Example 2

A prepreg for FRP was produced using the composition of Table 1 and carbon fiber fabric ("Trayca CO6343", trade name; product of Toray Industries, Inc., CF cloth).

TABLE 1

| Sample No. | Composition | Molar ratio of functional group |
|---|---|---|
| 1 | liquid isocyanate/PPG200 | 1.05/1.0 |
| 2 | liquid isocyanate/PPG400 | 1.05/1.0 |
| 3 | liquid isocyanate/PPG400/1,4BG | 1.55/1.0/0.5 |

Liquid isocyanate: a mixture of carbodiimide-modified 4,4'-diphenylmethane diisocyanate and 4,4'-diphenylmethane diisocyanate PPG200: polypropylene glycol (average molecular weight: 200)

PPG400: polypropylene glycol (average molecular weight: 400)

1,4BG: 1,4-butane diol (chain extender)

Sample 1 corresponds to Composition 2. A prepreg was produced using this Sample 1 by vacuum RTM.

Prepreg Producing Conditions:
The number of layers stacked: two layers
Plate thickness: 0.5 mm
Semi-curing conditions: at 60° C. for 2 hours under vacuum.

First, a CF cloth was cut and disposed in a mold for molding a plate of 0.25 mm thick. Then, the mold was made into a vacuum by vacuum suction. The base resin and curing agent of Composition 2 were cooled to room temperature after evacuation at 60° C. for about 2 hours. Stirring and mixing were then performed at a molar ratio, as that of a functional group, of liquid isocyanate:polyol=1.05:1.0, by which the white turbid resin component became transparent in about 2 minutes. The transparent resin component was cast into a mold, followed by semi-curing under curing conditions of 60° C. and 2 hours in vacuum under pressure. After the semi-curing, the prepreg for FRP was released from the mold and cut into pieces of a predetermined size.

By using Sample 2 (corresponding to Composition 2) and Sample 3 (corresponding to Composition 1), prepregs for FRP were produced by hot press molding, respectively.

Prepreg Producing Conditions:
The number of layers stacked: one layer
Plate thickness: 0.25 mm
Semi-curing conditions: at 60° C. for 2 hours under vacuum.

The prepreg for FRP was produced by hot pressing.

First, a CF cloth was cut and disposed in a spacer of about 1 mm thick.

The base resin and curing agent of the composition were cooled to room temperature after evacuation at 60° C. for about 2 hours. Stirring and mixing of Sample 2 were performed at a molar ratio (as a functional group) of a liquid isocyanate (MDI)/polyol (PPG400)=1.05/1.0, while those of Sample 3 were performed at a molar ratio, as a functional group, of a liquid isocyanate (MDI)/polyol (PPG400)/chain extender (1,4BG)=1.55/1.0/0.5, by which the white turbid resin components became transparent in about 2 minutes.

The transparent resin components were each poured onto the CF cloth. After covering with a Teflon™ film, a rubber roller was applied to impregnate the cloth with the resin and at the same time, to discharge the bubbles outside. The resulting cloth impregnated with the resin was semi-cured by pressing it at about 1 kgf/mm2 between aluminum plates at 60° C. for about 2 hours.

The semi-cured product was then cooled to room temperature under pressure, released from the mold, and then, cut into pieces of a predetermined size.

CFRP was produced using each of Samples 1 to 3 of the prepreg for FRP.

Molding or forming method: hot pressing.
Constitution of the stacked layers:
CFRP sample 1: 2 layers
CFRP samples 2 and 3: 4 layers
Thickness of CFRP plate: preset plate thickness 1 mm.
Curing conditions: at 150° C. for 1 hour, pressing pressure: about 1 kgf/mm2.

The Tg of each of the CFRP Samples 1 to 3 which were trial products was determined by measuring their dynamic viscoelasticity. Shape fixity—shape recovery properties of them were also confirmed. The results are shown in Table 2.

TABLE 2

| Sample No. | Tg (° C.) | Shape fixity - shape recovery properties |
|---|---|---|
| 1 | 95 | Good |
| 2 | 43 | Good |
| 3 | 57 | Good |

It has been understood that as described above, the prepreg for FRP according to the present invention which has been obtained by impregnating a fibrous material with a shape memory polymer using Composition 1 or 2 has a sufficient pot life, and permits convenient production of FRP moldings because the matrix resin can be stored under a semi-cured state. This suggests that the FRP moldings can be produced in a simple and easy manner and at the same time, the FRP moldings thus obtained are equipped with a desirable Tg and shape memory properties (inflatability).

As described above, the present invention provides a prepreg for FRP having a sufficient pot life and permitting easy production of an FRP molding and a production process of the prepreg.

The prepreg for FRP according to the present invention can be obtained by impregnating a fibrous material with a composition equipped with shape memory properties. Since the matrix resin of it can be stored under a semi-cured state, the prepreg has a sufficient pot life. It can be understood that an FRP molding can be produced easily, and at the same time, an FRP molding thus obtained has a good Tg and shape memory properties (inflatability).

The disclosure of Japanese Patent Application No. 2003-095201 filed on Mar. 31, 2003 including the specification, the claims, and the abstract is incorporated herein by reference in its entirety.

What is claimed is:

1. A production process of a prepreg of fiber reinforced plastic, comprising:
   impregnating a fibrous material with a matrix resin composition consisting of a liquid isocyanate, a polyol, and a bifunctional chain extender having two active hydrogen groups at a molar ratio, as a functional group, of isocyanate:polyol:chain extender=1.58:1.00:0.50 or 1.56:1.00:0.50; and
   semi-curing the impregnated matrix resin composition at 60° C.;
   wherein
   the liquid isocyanate comprises carbodiimide-modified 4,4'-diphenylmethane diisocyanate and 4,4'-diphenylmethane diisocyanate;
   the polyol comprises polypropylene glycol having an average molecular weight of 400; and
   the chain extender comprises 1,4-butane glycol.

2. A production process of a prepreg of fiber reinforced plastic, comprising:
   impregnating a fibrous material with a matrix resin composition containing consisting of a liquid isocyanate and a polyol at a molar ratio, as a functional group, of liquid isocyanate:polyol=1.05:1.00; and
   semi-curing the impregnated matrix resin composition at 60° C.,
   wherein
   the liquid isocyanate comprises carbodiimide-modified 4,4'-diphenylmethane diisocyanate and 4,4'-diphenylmethane diisocyanate; and
   the polyol comprises at least one of polypropylene glycol (average molecular weight: 200) and polypropylene glycol (average molecular weight: 400).

* * * * *